United States Patent
Cui et al.

(10) Patent No.: US 12,432,660 B2
(45) Date of Patent: Sep. 30, 2025

(54) RADIO RESOURCE MANAGEMENT IN POWER SAVING MODE

(71) Applicant: Apple Inc., Cupertino, CA (US)

(72) Inventors: Jie Cui, San Jose, CA (US); Dawei Zhang, Saratoga, CA (US); Fangli Xu, Beijing (CN); Haitong Sun, Cupertino, CA (US); Hong He, San Jose, CA (US); Manasa Raghavan, Sunnyvale, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 17/593,459

(22) PCT Filed: May 15, 2020

(86) PCT No.: PCT/CN2020/090576
§ 371 (c)(1),
(2) Date: Sep. 19, 2021

(87) PCT Pub. No.: WO2021/227035
PCT Pub. Date: Nov. 18, 2021

(65) Prior Publication Data
US 2022/0303905 A1    Sep. 22, 2022

(51) Int. Cl.
*H04W 52/02* (2009.01)
*H04W 8/02* (2009.01)
(Continued)

(52) U.S. Cl.
CPC ......... *H04W 52/0245* (2013.01); *H04W 8/02* (2013.01); *H04W 24/08* (2013.01); *H04W 52/0235* (2013.01); *H04W 76/27* (2018.02)

(58) Field of Classification Search
CPC .............................. Y02D 30/70; H04W 24/08
See application file for complete search history.

(56) References Cited

U.S. PATENT DOCUMENTS

2014/0213259 A1    7/2014  Teyeb et al.
2015/0245269 A1*   8/2015  Shao ................. H04W 36/0085
                                                                370/332
(Continued)

FOREIGN PATENT DOCUMENTS

| CN | 109257956 | 1/2019 |
| CN | 110139307 | 8/2019 |
| WO | 2020/089513 | 5/2020 |

OTHER PUBLICATIONS

Nokia et al., "UE RRM Core requirements when applying UW power saving"; 3GPP TSG-RAN WG4 Meeting#94-e; R4-2001343; Mar. 6, 2020; 6 sheets.
(Continued)

*Primary Examiner* — Fabricio R Murillo Garcia
(74) *Attorney, Agent, or Firm* — Fay Kaplun & Marcin, LLP

(57) ABSTRACT

A user equipment (UE) is connected to a 5G New Radio (NR) network via a serving cell. The UE performs radio resource management (RRM) measurements on the serving cell, determines whether the UE satisfies power saving criteria for a first, second, or third mobility scenario while in a Radio Resource Control (RRC) idle state or RRC inactive state, wherein, when the UE is in the first or second mobility scenario, the UE performs RRM measurements with longer intervals relative to RRM measurements performed in a non-power-saving mode and wherein, when the UE is in the third scenario, the UE performs RRM measurements for neighbor cells with longer intervals relative to RRM measurements performed in a non-power-saving mode and determines a UE RRM configuration when the UE transi-
(Continued)

tions from any of the power saving scenarios or the non-power-saving mode to any other power saving scenarios or the non-power-saving mode.

20 Claims, 5 Drawing Sheets

(51) Int. Cl.
*H04W 24/08* (2009.01)
*H04W 76/27* (2018.01)

(56) References Cited

U.S. PATENT DOCUMENTS

| | | | |
|---|---|---|---|
| 2020/0045645 A1* | 2/2020 | Chopra | H04W 52/228 |
| 2020/0052803 A1* | 2/2020 | Deenoo | H04W 48/12 |
| 2020/0314868 A1* | 10/2020 | Tseng | H04B 17/318 |
| 2020/0322887 A1* | 10/2020 | Pao | H04L 5/0057 |
| 2021/0068013 A1* | 3/2021 | Cheng | H04W 48/18 |
| 2021/0352507 A1* | 11/2021 | He | H04W 52/0258 |
| 2022/0007293 A1* | 1/2022 | Kaikkonen | H04W 52/0251 |
| 2022/0038971 A1* | 2/2022 | Liberg | H04W 36/0058 |
| 2022/0116802 A1* | 4/2022 | Kim | H04W 76/27 |

OTHER PUBLICATIONS

MediaTek Inc., "Discussion on RRM measurement relaxation in IDLE/INACTIVE mode"; 3GPP TSG-RAN WG4 Meeting#94-e-Bis; R4-2003600; Apr. 30, 2020; 6 sheets.
CATT, "Email discussion summary for RAN4#94e_#114_NR UE pow_sav_RRM", 3GPP TSG-RAN WG4 Meeting #94bis-e, R4-2005397, May 4, 2020, 52 sheets.
MediaTek Inc., "Configurations for RRM Measurement Relaxation", 3GPP TSG-RAN WG2 Meeting #109bis Electronic, R2-2002735, Apr. 10, 2020, 4 sheets.
VIVO, "UE Power Consumption Reduction in RRM Measurement", 3GPP TSG-RAN WG2 Meeting #108, R2-1914694, Nov. 18-22, 2019, 6 sheets.

* cited by examiner

Method 400

500

RADIO RESOURCE MANAGEMENT IN POWER SAVING MODE

BACKGROUND INFORMATION

Mobility management (MM) is a functionality for tracking and locating user equipment (UEs). Mobility-related measurements may be used for various operations, such as, handovers. A UE may perform mobility-related measurements and, in certain scenarios, may relax radio resource management (RRM) requirements based on mobility-related considerations. For example, certain RRM measurements may be changed or suspended when the UE is in a low mobility state or away from the edge of the serving cell so that the UE may save power without a significant impact to the UE mobility performance.

SUMMARY

Some exemplary embodiments are related to a method performed by a user equipment (UE) connected to a serving cell of a 5G New Radio (NR) network. The method includes performing radio resource management (RRM) measurements on the serving cell, determining whether the UE satisfies power saving criteria for a first, second, or third mobility scenario while in a Radio Resource Control (RRC) idle state or RRC inactive state, the first mobility scenario being a low mobility state of a power saving mode, the second mobility scenario being a position state away from an edge of the serving cell of the power saving mode, and the third mobility scenario being both the low mobility state and the position state away from the edge of the serving cell of the power saving mode, wherein, when the UE is in the first or second mobility scenario, the UE performs RRM measurements with longer intervals relative to RRM measurements performed in a non-power-saving mode and wherein, when the UE is in the third scenario, the UE performs RRM measurements for neighbor cells with longer intervals relative to RRM measurements performed in a non-power-saving mode and determining a UE RRM configuration when the UE transitions from any of the first, second or third scenarios or the non-power-saving mode to any other one of the first, second or third scenarios or the non-power-saving mode.

Other exemplary embodiments are related to a user equipment (UE) having a transceiver and a processor. The transceiver is configured to connect to a serving cell of a 5G New Radio (NR) network. The processor is configured to perform radio resource management (RRM) measurements on the serving cell, determine whether the UE satisfies power saving criteria for a first, second, or third mobility scenario while in a Radio Resource Control (RRC) idle state or RRC inactive state, the first mobility scenario being a low mobility state of a power saving mode, the second mobility scenario being a position state away from an edge of the serving cell of the power saving mode, and the third mobility scenario being both the low mobility state and the position state away from the edge of the serving cell of the power saving mode, wherein, when the UE is in the first or second mobility scenario, the UE performs RRM measurements with longer intervals relative to RRM measurements performed in a non-power-saving mode and wherein, when the UE is in the third scenario, the UE performs RRM measurements for neighbor cells with longer intervals relative to RRM measurements performed in a non-power-saving mode and determine a UE RRM configuration when the UE transitions from any of the first, second or third scenarios or the non-power-saving mode to any other one of the first, second or third scenarios or the non-power-saving mode. The third scenario is a relaxed configuration, the first and second scenarios are moderate configurations, and the non-power saving mode is a tight configuration.

Still further exemplary embodiments are related to a method performed by a user equipment (UE) connected to a serving cell of a 5G New Radio (NR) network. The method includes performing radio resource management (RRM) measurements on the serving cell, the RRM measurements including a signal strength and a quality for the connection, determining a correlation between first signal strength and quality thresholds for determining a cell center condition for the UE and second signal strength and quality thresholds for determining an away from cell edge condition for the UE and determining whether to enter into a power saving mode where RRM measurements are relaxed based on the correlation between the first thresholds and the second thresholds.

DETAILED DESCRIPTION

Figure 1:
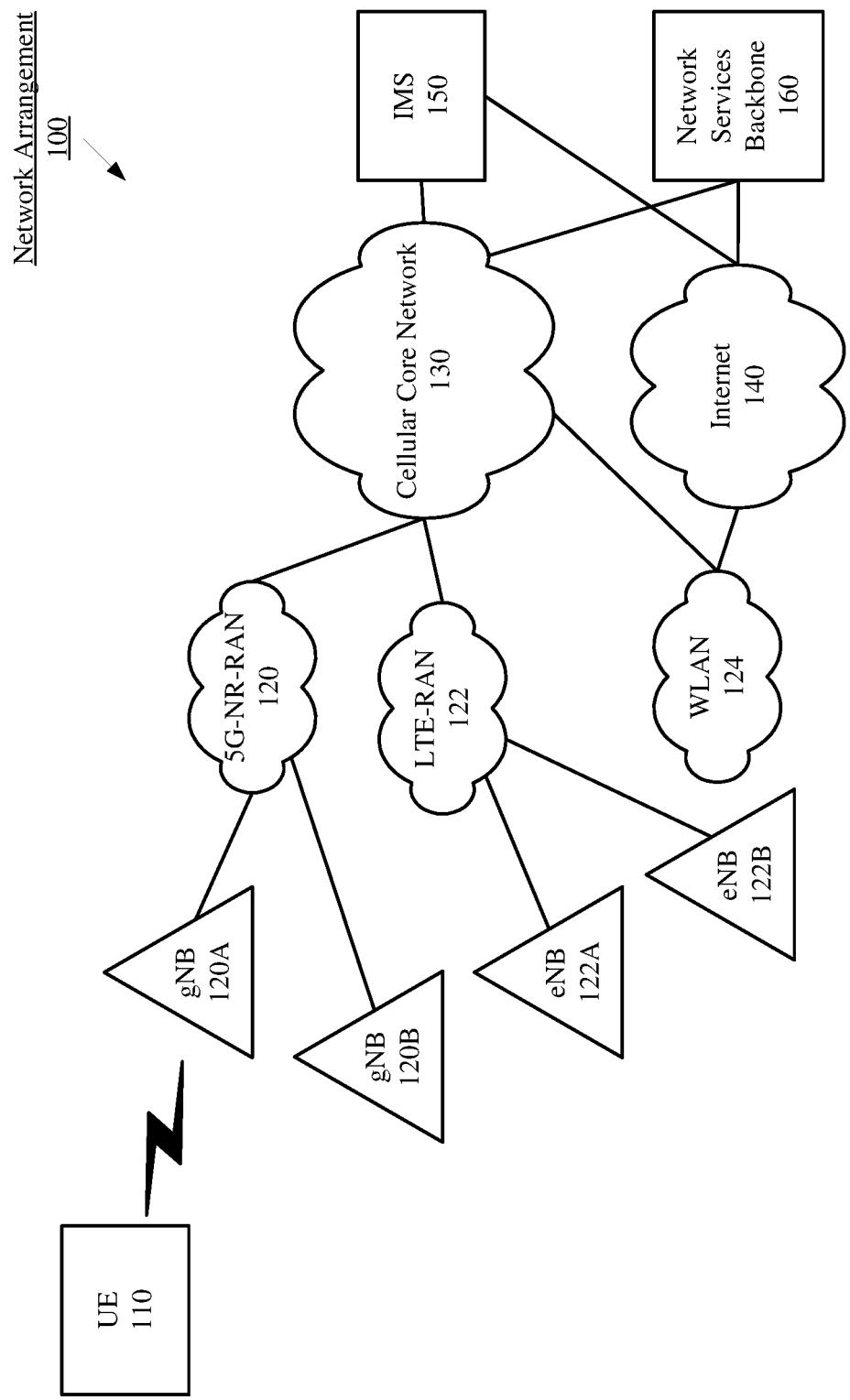
FIG. 1 shows a network arrangement according to various exemplary embodiments.

The exemplary embodiments may be further understood with reference to the following description and the related appended drawings, wherein like elements are provided with the same reference numerals. The exemplary embodiments describe radio resource management (RRM) configurations for a user equipment (UE) in a 5G New Radio (NR) network. Specifically, the exemplary embodiments describe RRM configurations for managing transitions between various mobility-related UE states and associated power saving configurations for the UE that may be implemented based on the mobility state. For example, the UE may transition from a relaxed RRM configuration, where certain RRM measurement requirements are reduced or suspended, to an active state where the full RRM measurements are used. The exemplary embodiments balance power-saving and mobility considerations during transitions between UE RRM states.

Network/Devices

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary embodiments, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs. Specifically, the UE 110 may have an initial connection to gNB 120A and perform cell reselection to transition to a connection on gNB 120B and end the connection with the gNB 120A. While camped on either one of the gNBs 120A or 120B, the UE 110 may enter into a mobility-related scenario, including a low mobility state and/or a position away from the edge of the serving cell. Various configurations for the UE are described herein for performing RRC measurements when the UE is transitioning between mobility-related states.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
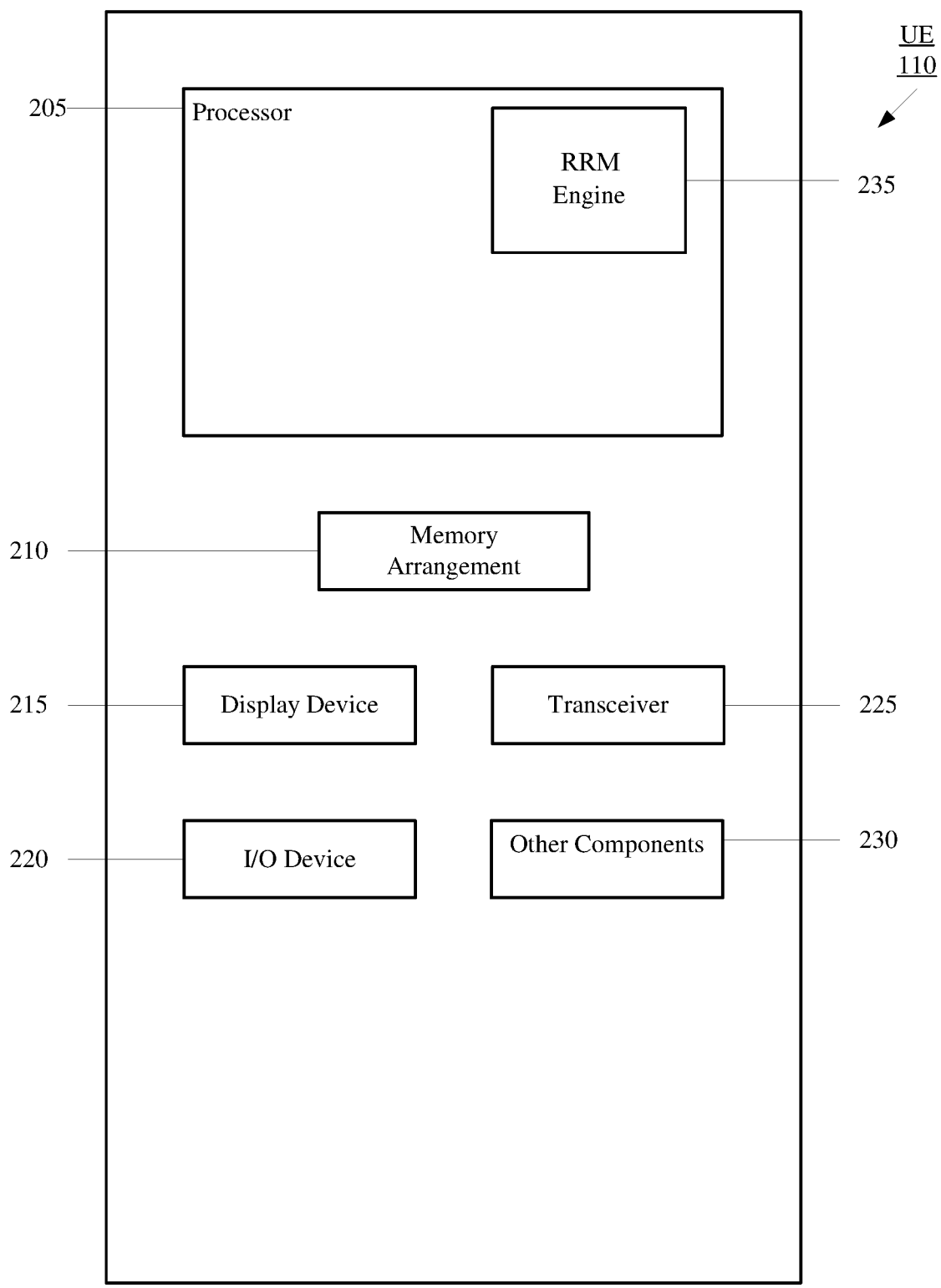
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a radio resource management (RRM) engine 235. The RRM engine 235 may perform operations including. The specific implementations for various scenarios will be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE. The memory 210 may be a hardware component configured to store data related to operations performed by the UE 110.

The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
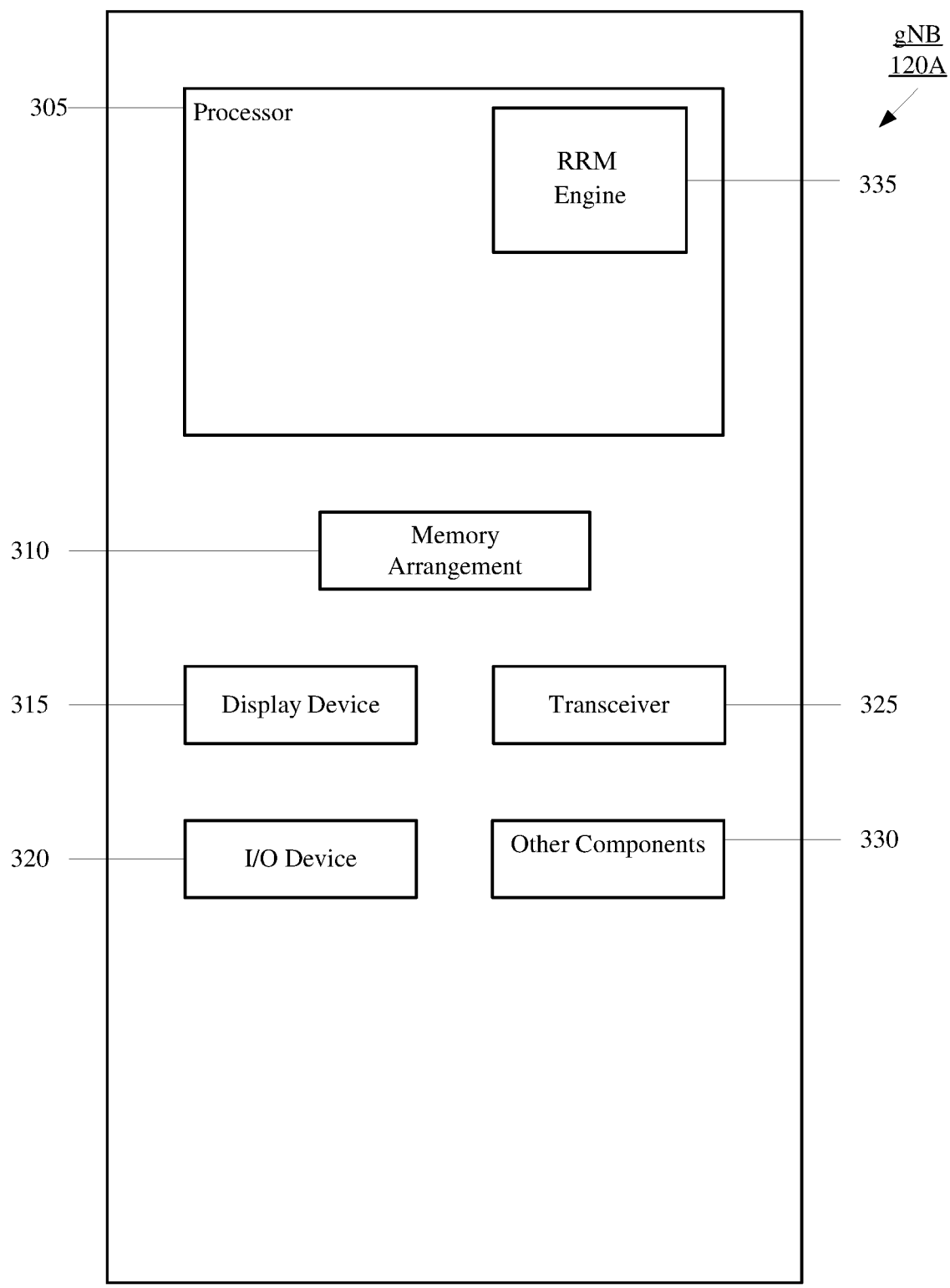
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a serving cell for the UE 110, where the UE 110 may enter different mobility states with respect to the network connection with the gNB 120A. The gNB 120A may represent any access node of the 5G NR network through which the UEs 110 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include an RRM engine 335. The RRM engine 335 may perform operations including X. The specific implementations for various scenarios will be described in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

RRM Power Saving

Mobility management (MM) is a functionality for tracking and locating user equipment (UEs). A UE may implement a power saving operation depending on its mobility state. In the following embodiments, three mobility-related scenarios are described. In the first scenario, the UE is in a low mobility state. The low mobility state is determined when certain criteria are met with respect to a change in UE position and is determined based on RRM measurements. The low mobility state may be defined in any number of manners. For example, the UE may determine that the UE has remained in same relative position (e.g., within a threshold distance from an initial location) for a threshold period of time. The relative position may be based on any known manner of determining position by a UE, e.g., GPS position, cell position determination, WiFi assisted positioning etc. The relative position threshold and the threshold period of time may be preconfigured in the UE or may be set by the network based on signaling. It should be understood that this is one exemplary manner of determining a low mobility state, but the exemplary embodiments are not limited to any particular manner of determining a low mobility state.

In the second scenario, the UE is in a position away from the edge of a cell to which it is connected, i.e., in a "not in cell edge" state. The second scenario is entered when the UE is determined to be in a position away from the cell edge based on RRM measurements e.g. signal strength and quality measurements. Again, the measured values associated with this scenario may be preconfigured for the UE or may be signaled by the network. Also, the exemplary embodiments may use other criteria to determine if the UE is in "not in cell edge" state.

In the third scenario, the UE is in both the low mobility state and the "not in cell edge" state. Although each of the three scenarios may be entered into when the UE is in either one of an RRC connected (active) state or an RRC idle/inactive (inactive) state, in the active state the power saving operations are not implemented. Thus, each of the scenarios described above are applicable only to a UE in the inactive state with regard to power-saving techniques, while the UE in the active state does not perform any RRM-related power saving techniques.

When the UE is in the inactive state and in one of the three mobility-related scenarios above, radio resource management (RRM) measurements may be relaxed for power saving purposes in one or both of the following two ways. In a first operation, when the UE is in either one of the first scenario (low mobility) or second scenario (not in cell edge), the UE may perform RRM measurements with longer intervals between measurements relative to the RRM measurements performed when the UE is in the active state. When the UE is in the third scenario (low mobility and not in cell edge), the UE is no longer required to meet intra-frequency and inter-frequency measurement requirements for neighbor cells that are required when the UE is in the active state. In other words, in the third scenario, the UE may suspend a subset of the RRM measurements. Thus, the third scenario corresponds to a least restrictive (relaxed) configuration, where the greatest number of operations are suspended or relaxed. The first and second scenarios correspond to a moderately restrictive (moderate) configuration, where RRM measurements are relaxed but none are suspended. The active state for the UE corresponds to a most restrictive (tight) configuration, where none of the RRM operations discussed above are relaxed/suspended.

Various options are available regarding the implementation of power saving operations during transitions between any of the three scenarios discussed above. In a first option, when the UE transitions to or from a state requiring intra/inter-frequency measurements (i.e. transitions from the relaxed configuration to either of the moderate or tight configurations, or transitions from either of the moderate or tight configurations to the relaxed configuration) during a cell-reselection or RRM measurement period, the cell reselection or measurement requirements for the tight configuration may be implemented during the transitionary period.

In a second option, when switching from the moderate configuration to the relaxed configuration, the UE may fulfil the requirements corresponding to the moderate configuration for N DRX cycles and thereafter switch to requirements corresponding to the relaxed configuration. When switching from the relaxed configuration to the moderate configuration, the UE may fulfil the requirements corresponding to the moderate configuration upon fulfilling the switching criteria. When switching from the tight configuration (active state) to either of the moderate or relaxed configurations, the UE may fulfil the requirements corresponding to the active state for N DRX cycles and thereafter switch to requirements corresponding to the moderate or relaxed configurations. When switching from either of the moderate or relaxed configurations to the tight configuration, the UE may fulfil the requirements corresponding to the active state upon fulfilling the switching criteria. However, some tradeoffs may be made between the two options discussed above to better balance a power saving gain and a mobility performance.

According to a first exemplary embodiment, when switching from a tighter configuration to a more relaxed configuration (e.g., from either of the first or second scenario to the third scenario, or from the active state to any of the first, second or third scenarios), the more relaxed requirements of whichever scenario is being entered into may be used after the transition. Since the mobility measurement demand in a relaxed configuration is not so urgent or critical compared to the prior (tighter) condition, the more relaxed configuration is used after the transition. The mobility performance in this embodiment is not seriously impacted relative to e.g. a configuration where the UE waits N DRX cycles prior to entering the more relaxed configuration. Further, the presently described embodiment provides a simple operation scheme.

However, when switching from a more relaxed configuration to a tighter configuration (e.g., from the third scenario to either of the first or second scenario, or from any of the first, second or third scenarios to the active state), the mobility measurement is more critical after this transition than the opposite scenario discussed above. For example, if the more relaxed requirements were used during the whole measurement procedure during the transition, including durations before and after transition, the mobility performance of the UE and the network will be impacted after the transition. Therefore, in this situation, the tighter requirements may be implemented immediately after transition.

Thus, according to the first exemplary embodiment described above, the UE behavior for a measurement period occurring during a transition from between power-saving configurations is defined as follows. In each of the transitional situations, the network has a same expectation for the measurement period or delay as that performed at the UE.

When switching from either of the first or second scenarios to the third scenario, the UE performs the measurements corresponding to the measurement period (or delay) for the third scenario.

When switching from the third scenario to either of the first or second scenarios, the UE performs the measurement corresponding to the measurement period for the first or second scenario upon fulfilling the switching criteria (i.e. transitioning to the first or second scenario). The UE may drop the previous measurement before transition and use only the measurements taken after transition.

When switching from the active state to any one of the first, second or third scenarios, the UE performs the measurement corresponding to the measurement period for whichever one of the first, second or third scenarios the UE is entering into.

When switching from any one of the first, second or third scenarios to the active state, the UE performs the measurement corresponding to the measurement period for the active state upon fulfilling the switching criteria (i.e. transitioning to the active state). The UE may drop the previous measurement before transition.

Figure 4:
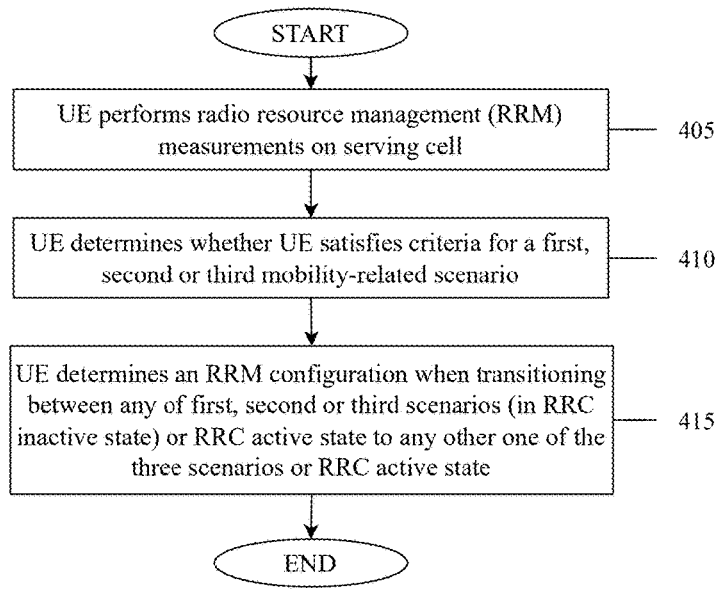
FIG. 4 shows a method for determining an RRM configuration for a UE during a transition between RRM power saving scenarios according to various exemplary embodiments.

FIG. 4 shows a method 400 for determining an RRM configuration for a user equipment (UE) during a transition between RRM power saving scenarios according to various exemplary embodiments. In 405, the UE performs radio resource management (RRM) measurements on the serving cell. As discussed above, the RRM measurements may indicate whether a power-saving configuration may be entered into or exited from.

In 410, the UE determines whether the UE satisfies criteria for a first, second or third mobility-related scenario. As discussed above, the first scenario is a low mobility state, the second scenario is a not-in-cell-edge state, and the third scenario is both of the low mobility state and the not-in-cell edge state. The scenarios may be entered into while in the RRC active state, but power saving configurations are implemented only when the UE in the RRC inactive state.

In 415, the UE determines an RRM configuration when transitioning between any of the first, second or third scenarios (in the RRC inactive state) or the RRC active state to any other one of the three scenarios or the RRC active state. As discussed above, the RRM configuration may be dependent on whether the UE is transitioning from a more relaxed configuration to a tighter configuration, or from a tighter configuration to a more relaxed configuration.

According to a second exemplary embodiment, parameters for an evaluation period are defined, the evaluation period being used for determining whether a power-saving configuration should be entered into or exited from. The frequency of triggering an RRM relaxation configuration change is dependent on the evaluation period of the power-saving criteria, e.g. determining whether the UE is in a low mobility state or not near a cell edge.

In the present embodiments, serving cell measurements are not relaxed in any manner (only neighbor cell measurements may be relaxed in scenario 3), so the UE performs serving cell measurements on a given interval, e.g. once every M1*N1*DRX_cycle. The serving cell measurements inform the evaluation of whether to change into or out of a power-saving configuration. A transition from a power saving mode to the normal (active) mode implies that the UE has a higher mobility or is approaching the edge of the serving cell, so the mobility measurements become more important than power saving and the UE should respond to the change in state should be as soon as possible. A transition from the normal (active) mode to a power saving mode implies that the UE has a lower mobility or is leaving the edge of the serving cell, and the evaluation may be conducted as often as the mobility measurements are conducted without any additional power consumption.

In brief, since the state change evaluation (i.e. evaluation of whether to relax or tighten RRM requirements) is based on the serving cell RRM measurements, and the serving cell RRM measurements are not relaxed in any of the UE configurations, the evaluation speed may be matched to the serving cell measurement speed without impacting the UE from either a power consumption perspective or a complexity perspective.

The evaluation of RRM relaxation criteria may be as often as and as long as every serving cell measurement period. The evaluation period for determining RRM relaxation criteria for a power saving mode may be equal to the serving cell measurement period at the UE, or the step size of evaluation sliding window for RRM relaxation criteria for power saving mode may be equal to the serving cell measurement period at the UE. For example, if the window size is 20 measurements and there is one measurement per C-DRX cycle, the step size for the sliding window may be set to one measurement period that corresponds in this example to one C-DRX cycle.

The thresholds for determining the "not-at-cell-edge" condition may be similar to thresholds for determining a cell center condition. The same RRM measurement parameters may be compared to various thresholds for determining these conditions.

The RRM measurement parameters include level selection and quality levels for a cell. For example, the $S_{rxlev}$ parameter may be representative of a cell selection Rx power level (in dB) measured by the UE. The $S_{qual}$ parameter may be representative of a quality level. The "not-atcell-edge" scenario, as described above, is defined as $S_{rxlev}$ being greater than threshold $S_{SearchThresholdP}$ and $S_{qual}$ being greater than threshold $S_{SearchThresholdQ}$. When the criteria are met, the UE may determine that it is in the "non-at-cell-edge" scenario. However, a related scenario that the UE may enter into is a "cell center" scenario. The cell center scenario may be defined differently than the "not-at-cell-edge" scenario. For example, different thresholds may be used relative to the determined $S_{rxlev}$ and $S_{qual}$ values to determine whether the UE is in the cell center or not. In one example, thresholds for inter-frequency measurement triggering, i.e. thresholds $S_{nonIntraSearchP}$ and $S_{nonIntraSearchQ}$, may be used, i.e. when the $S_{rxlev}$ value is determined to be greater than threshold $S_{nonIntraSearchP}$ and the $S_{qual}$ value is determined to be greater than threshold $S_{nonIntraSearchQ}$ the UE may be considered to meet the "cell center" criteria. The $S_{nonIntraSearchP}$ and $S_{nonIntraSearchQ}$ thresholds may be higher than the $S_{SearchThresholdP}$ and $S_{SearchThresholdQ}$ thresholds. In another example, thresholds for intra-frequency measurement triggering, i.e. thresholds $S_{IntraSearchP}$ and $S_{IntraSearchQ}$, may be used. 3GPP TS 38.304, v.15.6.0, section 5.2.4.2 states, "if the serving cell fulfils $S_{rxlv}>S_{IntraSearchP}$ and $S_{qual}>S_{IntraSearchQ}$, the UE may choose not to perform intra-frequency measurements. Otherwise, the UE shall perform intra-frequency measurements." Thus, satisfying the thresholds $S_{IntraSearchP}$ and $S_{IntraSearchQ}$ may also be considered as meeting the "cell center" criteria.

The thresholds for determining the cell center condition may be configured as greater than or less than the not-at-cell-edge thresholds, depending on particular network implementations. According to a third exemplary embodiment, the UE RRM power saving behavior may be dependent on the relative differences between the thresholds.

Figure 5:
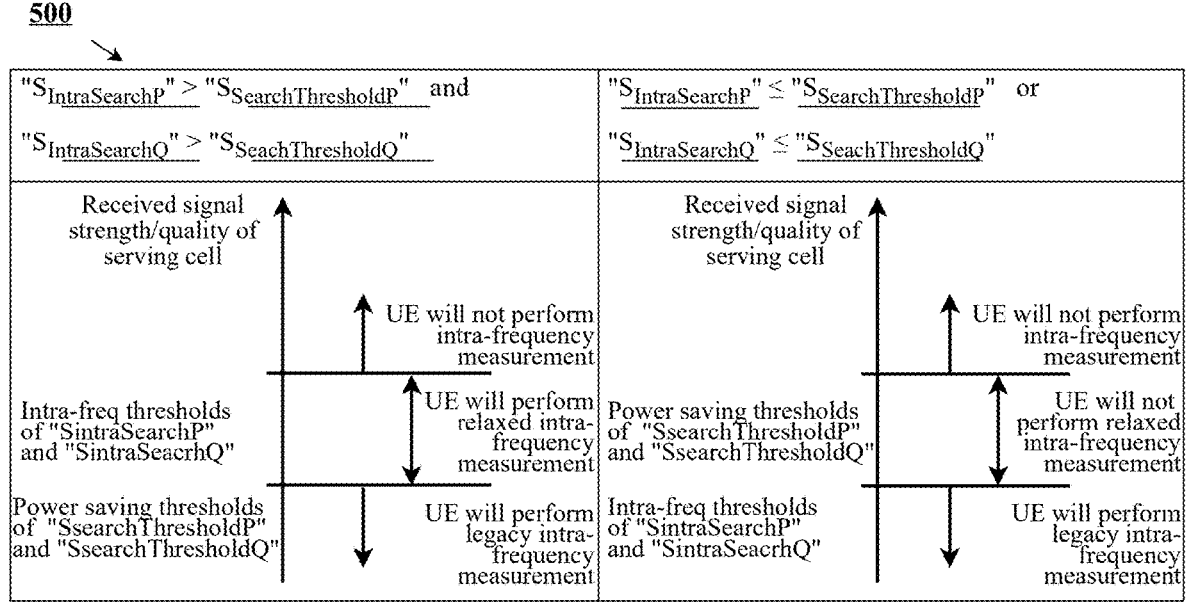
FIG. 5 shows a diagram for determining UE intra-frequency measurement behavior when a cell center condition and a not-at-cell-edge condition are not aligned according to various exemplary embodiments.

FIG. 5 shows a diagram 500 for determining UE intra-frequency measurement behavior when a cell center condition and a not-at-cell-edge condition are not aligned according to various exemplary embodiments. The left column shows UE behavior for a first embodiment when the signal strength and quality thresholds for determining whether intra-frequency measurements may be suspended ($S_{IntraSearchP}$ and $S_{IntraSearchQ}$) are both greater than the respective signal strength and quality thresholds for determining whether the UE is away from the cell edge. The right column shows UE behavior for a second embodiment when either one of the signal strength and quality thresholds for determining whether intra-frequency measurements may be suspended ($S_{IntraSearchP}$ and $S_{IntraSearchQ}$) are less than or equal to the respective signal strength and quality thresholds for determining whether the UE is away from the cell edge.

Without a low mobility condition, even if "$S_{IntraSearchP}$"≤"$S_{SearchThresholdP}$" or "$S_{IntraSearchQ}$"≤"$S_{SearchThresholdQ}$", the UE will not perform intra-frequency measurement with relaxation. The network behavior for intra-frequency measurement in power saving is defined as follows.

The network may avoid configuring an intra-frequency requirement when the threshold configured for the not-at-cell-edge condition is higher than that for cell center condition of "$S_{IntraSearchP}$" or "$S_{IntraSearchQ}$". If such a case is configured, the UE may disable the power saving mode regardless of the power saving criteria being met or not. The network may avoid configuring an inter-frequency requirement when the threshold configured for the not-at-cell-edge condition is higher than that for cell center condition of "$S_{nonIntraSearchP}$" or "$S_{nonIntraSearchQ}$". If such a case is configured, the UE may disable the power saving mode regardless of the power saving criteria.

In the left column (first embodiment), when the signal strength and quality measurements are greater than the intra-frequency thresholds, the UE does not perform intra-frequency measurements. When the signal strength and quality measurements are between the intra-frequency thresholds and the power saving thresholds (not in cell edge), the UE performs relaxed intra-frequency measurements. If the signal strength and quality measurements are below the power saving thresholds (not in cell edge), the UE will perform legacy intra-frequency measurements.

In the right column (second embodiment), when the signal strength and quality measurements are greater than the power saving thresholds, the UE does not perform intra-frequency measurements. When the signal strength and quality measurements are between the intra-frequency thresholds and the power saving thresholds, again, the UE does not perform the intra-frequency measurements. If the signal strength and quality measurements are below the intra-frequency thresholds, the UE will perform legacy intra-frequency measurements.

Figure 6:
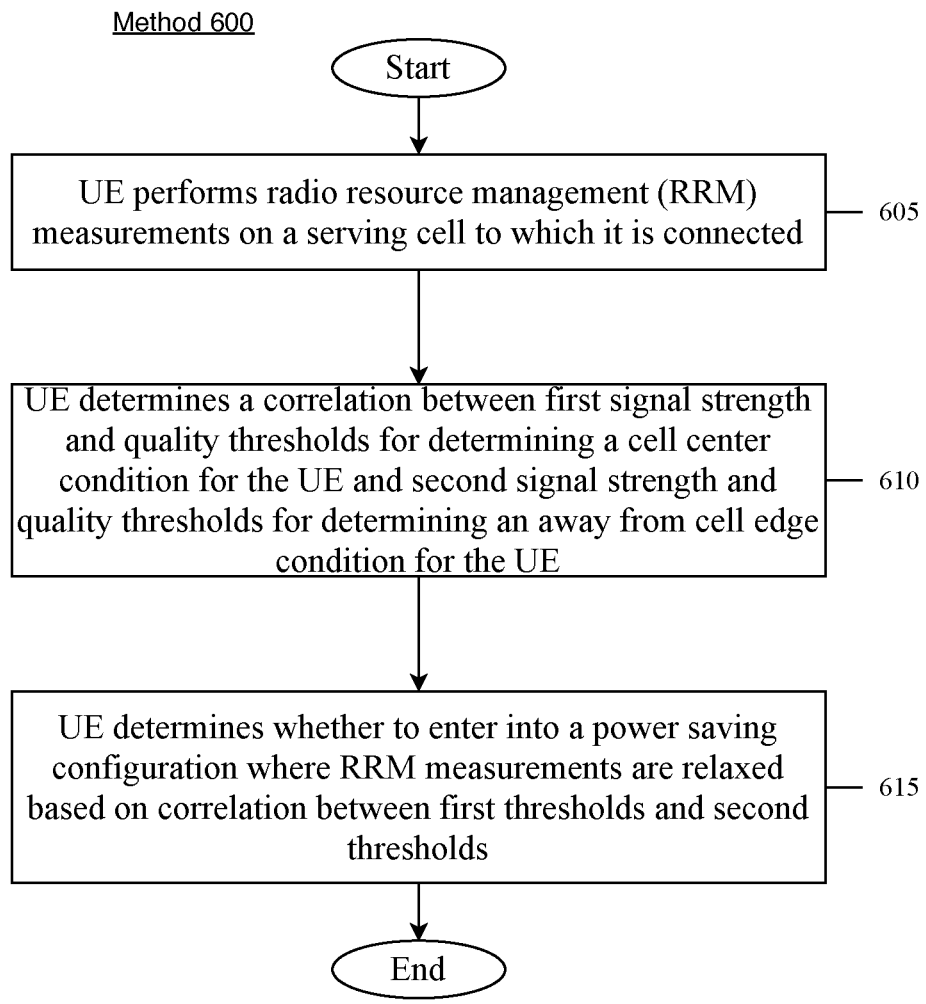
FIG. 6 shows a method for determining whether to enter into a power saving configuration based on a correlation between cell center thresholds and not-in-cell-edge thresholds according to various exemplary embodiments.

FIG. 6 shows a method 600 for determining whether to enter into a power saving configuration based on a correlation between cell center thresholds and not-in-cell-edge thresholds according to various exemplary embodiments.

In 605, the UE performs radio resource management (RRM) measurements on a serving cell to which it is connected. As discussed above, the RRM measurements may include signal strength and quality measurements indicating whether a power-saving configuration may be entered into or exited from.

In 610, the UE determines a correlation between first signal strength and quality thresholds for determining a cell center condition for the UE and second signal strength and quality thresholds for determining an away from cell edge condition for the UE. As discussed above, when the first thresholds and second thresholds are not aligned, the UE may determine its configuration based on the relative threshold levels and the RRM measurements.

In 615, the UE determines whether to enter into a power saving configuration where RRM measurements are relaxed based on the correlation between the first thresholds and the second thresholds. The specific implementation of this determination is discussed in detail above.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A method, comprising:
at a user equipment (UE) connected to a serving cell of a 5G New Radio (NR) network:
performing radio resource management (RRM) measurements on the serving cell, the RRM measurements including a signal strength and a quality for the connection;
determining a relative difference between first signal strength and quality thresholds for determining a cell center condition for the UE and second signal strength and quality thresholds for determining an away from a cell edge condition for the UE, wherein the first signal strength and quality thresholds are greater than the second signal strength and quality thresholds;
determining whether to enter into a power saving mode where the RRM measurements are relaxed based on the relative difference between the first signal strength and quality thresholds and the second signal strength and quality thresholds;
when the signal strength and quality measurements are greater than the first signal strength and quality thresholds, the UE does not perform intra-frequency measurements;
when the signal strength and quality measurements are between the first signal strength and quality thresholds and the second signal strength and quality thresholds, the UE performs relaxed intra-frequency measurements; and
when the signal strength and quality measurements are below the second signal strength and quality thresholds, the UE performs legacy intra-frequency measurements.

2. The method of claim 1, wherein the determine whether to enter into the power saving mode occurs during an evaluation period that is equal to a serving cell measurement period.

3. The method of claim 1, wherein the RRM measurement includes a cell selection receive (RX) power level.

4. The method of claim 1, wherein the determine whether to enter into the power saving mode occurs when the UE is in a radio resource control (RRC) connected state.

5. The method of claim 1, wherein the determine whether to enter into the power saving mode occurs when the UE is in a radio resource control (RRC) idle state.

6. The method of claim 1, wherein the determine whether to enter into the power saving mode occurs when the UE is in a radio resource control (RRC) inactive state.

7. A processor configured to:
receive radio resource management (RRM) measurements for a serving cell, the RRM measurements including a signal strength and a quality for a connection with the serving cell;
determine a relative difference between first signal strength and quality thresholds for determining a cell center condition for a user equipment (UE) and second signal strength and quality thresholds for determining an away from a cell edge condition for the UE, wherein the first signal strength and quality thresholds are greater than the second signal strength and quality thresholds;
determine whether to enter into a power saving mode where the RRM measurements are relaxed based on the relative difference between the first signal strength and quality thresholds and the second signal strength and quality thresholds;
when the signal strength and quality measurements are greater than the first signal strength and quality thresholds, the UE does not perform intra-frequency measurements;
when the signal strength and quality measurements are between the first signal strength and quality thresholds and the second signal strength and quality thresholds, the UE performs relaxed intra-frequency measurements; and
when the signal strength and quality measurements are below the second signal strength and quality thresholds, the UE performs legacy intra-frequency measurements.

8. The processor of claim 7, wherein the determine whether to enter into the power saving mode occurs when the UE is in a radio resource control (RRC) inactive state.

9. The processor of claim 7, wherein the determine whether to enter into the power saving mode occurs during an evaluation period that is equal to a serving cell measurement period.

10. The processor of claim 7, wherein the RRM measurement includes a cell selection receive (RX) power level.

11. The processor of claim 7, wherein the determine whether to enter into the power saving mode occurs when the UE is in a radio resource control (RRC) connected state.

12. The processor of claim 7, wherein the determine whether to enter into the power saving mode occurs when the UE is in a radio resource control (RRC) idle state.

13. A processor configured to:
determine a relative difference between first signal strength and quality thresholds for determining a cell center condition for a user equipment (UE) and second signal strength and quality thresholds for determining an away from a cell edge condition for the UE;
determine whether to enter into a power saving mode where radio resource management (RRM) measurements are relaxed based on the relative difference between the first signal strength and quality thresholds and the second signal strength and quality thresholds;
when the first signal strength and quality thresholds are greater than the second signal strength and quality thresholds, a network configures the UE to perform intra-frequency measurements; and
when the second signal strength and quality thresholds are greater than the first signal strength and quality thresholds, the network does not configure the UE to perform intra-frequency measurements.

14. The processor of claim 13, further comprising:
when the first signal strength and quality thresholds are greater than the second signal strength and quality thresholds, the network configures the UE to perform inter-frequency measurements.

15. The processor of claim 14, further comprising:
when the second signal strength and quality thresholds are greater than the first signal strength and quality thresholds, the network does note configures the UE to perform inter-frequency measurements.

16. The processor of claim 13, wherein the determine whether to enter into the power saving mode occurs during an evaluation period that is equal to a serving cell measurement period.

17. The processor of claim 13, wherein the RRM measurement includes a cell selection receive (RX) power level.

18. The processor of claim 13, wherein the determine whether to enter into the power saving mode occurs when the UE is in a radio resource control (RRC) connected state.

19. The processor of claim 13, wherein the determine whether to enter into the power saving mode occurs when the UE is in a radio resource control (RRC) idle state.

20. The processor of claim 13, wherein the determine whether to enter into the power saving mode occurs when the UE is in a radio resource control (RRC) inactive state.

* * * * *